(12) United States Patent
Yong et al.

(10) Patent No.: US 12,173,547 B2
(45) Date of Patent: Dec. 24, 2024

(54) POWER SUPPLY DEVICE FOR VEHICLE WINDOW

(71) Applicant: KWANG JIN MACHINE CO., LTD., Asan-si (KR)

(72) Inventors: Kyeong Jung Yong, Asan-si (KR); Jai Hun Cho, Cheonan-si (KR)

(73) Assignee: KWANG JIN MACHINE CO., LTD., Asan-si (KR)

( * ) Notice: Subject to any disclaimer, the term of this patent is extended or adjusted under 35 U.S.C. 154(b) by 0 days.

(21) Appl. No.: 18/277,534

(22) PCT Filed: Mar. 23, 2021

(86) PCT No.: PCT/KR2021/003571
§ 371 (c)(1),
(2) Date: Aug. 16, 2023

(87) PCT Pub. No.: WO2022/177062
PCT Pub. Date: Aug. 25, 2022

(65) Prior Publication Data
US 2024/0044198 A1 Feb. 8, 2024

(30) Foreign Application Priority Data
Feb. 17, 2021 (KR) .................. 10-2021-0021145

(51) Int. Cl.
*B60J 1/17* (2006.01)
*B60R 16/023* (2006.01)
(Continued)

(52) U.S. Cl.
CPC .......... *E05F 15/689* (2015.01); *B60R 16/023* (2013.01); *B60R 16/03* (2013.01);
(Continued)

(58) Field of Classification Search
CPC ...... E05F 15/689; B60R 16/023; B60R 16/03; B60R 16/027; H02G 11/00; H02G 3/0406;
(Continued)

(56) References Cited

U.S. PATENT DOCUMENTS 2,336,530 A * 12/1943 Chandler .............. E05F 11/423
49/361
4,939,867 A * 7/1990 Harada ................. E05F 15/689
49/362
(Continued)

FOREIGN PATENT DOCUMENTS

CN 105794063 A 7/2016
JP 2002-144876 A 5/2002
(Continued)

*Primary Examiner* — Jerry E Redman
(74) *Attorney, Agent, or Firm* — Bridgeway IP Law Group, PLLC; Jihun Kim (57) ABSTRACT

A power supply device for a vehicle window includes a carrier plate including a first electrical connection portion to transmit power, a bracket including a second electrical connection portion to which external power is connected, and a flexible connection means including a side electrically connected to the first electrical connection portion of the carrier plate and another side electrically connected to the second electrical connection portion of the bracket, in which the side of the flexible connection means is pivotally connected to the first electrical connection portion and the other side thereof is pivotally connected to the second electrical connection portion.

5 Claims, 9 Drawing Sheets

(51) Int. Cl.
  *B60R 16/03* (2006.01)
  *E05F 15/689* (2015.01)
  *H02G 11/00* (2006.01)
(52) U.S. Cl.
  CPC .......... *H02G 11/00* (2013.01); *E05Y 2201/64* (2013.01); *E05Y 2201/654* (2013.01); *E05Y 2201/684* (2013.01); *E05Y 2600/626* (2013.01); *E05Y 2900/55* (2013.01)
(58) Field of Classification Search
  CPC ......... E05Y 2201/654; E05Y 2201/684; E05Y 2600/626; E05Y 2900/55; E05Y 2400/654; B60J 1/17; H01B 7/02; H01B 7/04
  USPC .................................................... 49/348, 349
  See application file for complete search history.

(56) References Cited

U.S. PATENT DOCUMENTS

| | | | | |
|---|---|---|---|---|
| 5,309,677 | A * | 5/1994 | Kunert | E05F 11/423 49/350 |
| 5,537,782 | A * | 7/1996 | Klippert | E05F 15/689 49/358 |
| 6,174,020 | B1 * | 1/2001 | Knettle | B60J 5/06 49/362 |
| 7,086,687 | B2 * | 8/2006 | Aoki | H02G 11/006 191/23 R |
| 7,500,331 | B2 * | 3/2009 | Hiramatsu | E05F 15/689 49/358 |
| 10,427,504 | B2 * | 10/2019 | Mueller | B60J 1/1846 |
| 10,439,321 | B2 * | 10/2019 | Klein | H01R 13/6275 |
| 10,858,875 | B2 * | 12/2020 | Reul | E06B 7/28 |
| 11,208,838 | B2 * | 12/2021 | Robison | E05D 15/165 |
| 11,318,818 | B2 * | 5/2022 | Arimoto | E05F 15/689 |
| 11,530,567 | B2 * | 12/2022 | Nam | B60J 1/17 |
| 11,745,566 | B2 * | 9/2023 | Nam | B60R 16/03 359/265 |
| 2001/0052203 | A1 * | 12/2001 | Doshita | B60R 16/0215 49/502 |
| 2006/0042167 | A1 * | 3/2006 | Dedrich | E05F 15/689 49/358 |
| 2006/0059782 | A1 * | 3/2006 | Garcia | B60R 16/0215 49/358 |
| 2009/0178340 | A1 * | 7/2009 | Noritsugu | B60R 16/0215 49/358 |
| 2014/0238967 | A1 * | 8/2014 | Boyce | B60P 1/00 219/203 |
| 2014/0247473 | A1 * | 9/2014 | Kuhnen | B60J 3/04 359/238 |
| 2018/0090876 | A1 * | 3/2018 | Klein | H01R 43/26 |
| 2019/0161034 | A1 | 5/2019 | Isoda et al. | |

FOREIGN PATENT DOCUMENTS

| | | |
|---|---|---|
| JP | 2008-247086 A | 10/2008 |
| JP | 2009-219318 A | 9/2009 |
| JP | 2014-068419 A | 4/2014 |

* cited by examiner

POWER SUPPLY DEVICE FOR VEHICLE WINDOW

TECHNICAL FIELD

The present disclosure relates to a power supply device for a vehicle window, and more particularly, to a power supply device for a vehicle window, which is capable of easily supplying power to a window while having a simple structure.

BACKGROUND ART

Generally, a window is installed on a door of a vehicle and opens or closes an opening of the door while ascending and descending.

More specifically, in the door of the vehicle is installed a vehicle window regulator which includes a guide rail arranged in the door in a vertical direction, a carrier plate slidably connected to the guide rail, and a wire connected to a driving means to do a circular trajectory motion and connected to the carrier plate to lift or lower the carrier plate. In this case, the window may be fixedly installed in the carrier plate of the window regulator to ascend or descend together with the carrier plate.

Recently, technology has been studied to contain various information in vehicle windows. That is, technologies are being developed in which after a transparent display is installed on a window, the display is transparent normally, but displays bright and vivid graphics to display information or reproduce an image. In addition, technologies for changing light blocking properties according to external light, unlike existing tinting, have been developed, and research has been conducted on technologies to embed heat wires in windows as needed.

A difficulty in developing these technologies is that the window is not fixedly installed, but frequently ascends or descends, making it difficult to supply power to the window that is a movable body.

When power is supplied wiredly, in a process where the wire moves together with the ascending or descending window, the wire may be short-circuited or come into contact with nearby components, causing noise, and when power is supplied wirelessly, excessively high cost is required.

DISCLOSURE

Technical Problem

Embodiments of the present disclosure provide a power supply device for a vehicle window, which solves the above-described problems of related arts. Embodiments of the present disclosure provide a power supply device for a window including a carrier plate including a first electrical connection portion, a bracket including a second electrical connection portion to which power is connected and being fixed to a guide rail or a periphery portion thereof, and a flexible connection means electrically interconnecting the first electrical connection portion and the second electrical connection portion.

Technical Solution

According to an embodiment of the present disclosure, a power supply device for a vehicle window to supply power to a window ascending and descending along a guide rail provided inside a vehicle door includes a carrier plate installed to be lifted or lowered on the guide rail, being lifted or lowered inside the door together with the window being fixedly coupled thereto, and including a first electrical connection portion to transmit power to the window, a bracket fixedly installed on the guide rail or a periphery portion of the guide rail between an upper end and a lower end of the guide rail and including a second electrical connection portion to which a power source is connected, and a flexible connection means including a side electrically connected to the first electrical connection portion of the carrier plate and another side electrically connected to the second electrical connection portion of the bracket, and transmitting the electrical signal supplied from the power source to the first electrical connection portion through the second electrical connection portion, in which the side of the flexible connection means is pivotally connected to the first electrical connection portion and the other side thereof is pivotally connected to the second electrical connection portion, and in a process of the carrier plate being lifted and lowered, the flexible connection means is spread or bent between the first electrical connection portion and the second electrical connection portion to transmit the electrical signal of the power source to the carrier plate.

In the power supply device for the vehicle window, the flexible connection means may include a first connection member having a pillar shape and rotatably connected to the first electrical connection portion, a second connection member having a pillar shape and rotatably connected to the second electrical connection portion, and a cable interconnecting the first connection member and the second connection member.

In the power supply device for the vehicle window, the cable may have a bar shape of a rectangular cross-section and include a lateral surface extending from a side surface of the first connection member in the pillar shape and a thickness surface positioned perpendicularly to the lateral surface and having a length less than a length of the lateral surface, and the cable may be allowed to be bent in a direction perpendicular to the side surface, and may be suppressed from being bent in a direction perpendicular to the thickness surface.

In the power supply device for the vehicle window, a plurality of electric wires may extend long in a longitudinal direction inside the cable, and may be connected to the first electrical connection portion through the first connection member.

In the power supply device for the vehicle window, the cable may include a first connection bar and a second connection bar that extend long in a direction and are arranged in parallel to each other, and first connection members interconnecting a surface of the first connection bar and a surface of the second connection bar and being separated from each other in the longitudinal direction and second connection members interconnecting another surface of the first connection bar and another surface of the second connection bar and being arranged alternately with the first connection members, and the plurality of electric wires may pass through the first connection members and the second connection members.

In the power supply device for the vehicle window, the cable may include the plurality of electric wires and a covering having a circular cross-section to cover the plurality of electric wires.

Advantageous Effects

According to an embodiment of the present disclosure, the flexible connection means connecting the window to the power and making electrical connection may be spread or bent on a specific path along with lifting or lowering of the carrier plate, thereby preventing vibration or stretching.

According to an embodiment of the present disclosure, the flexible connection means may pivotally rotate along with lifting or lowering of the carrier plate, thereby avoiding excessive bending of the electric wire without disturbing lifting or lowering of the carrier plate.

MODE FOR INVENTION

Embodiments of the present disclosure are illustrated for the purpose of describing the technical spirit of the present disclosure. The scope of rights according to the present disclosure is not limited to the embodiments presented below or specific descriptions of these embodiments.

All technical and scientific terms used in the present disclosure have meanings commonly understood by those of ordinary skill in the art to which the present disclosure belongs, unless defined otherwise. All terms used in the present disclosure are selected for the purpose of more clearly describing the present disclosure and are not selected to limit the scope of rights according to the present disclosure.

Expressions such as "comprising", "including", "having", etc. used in the present disclosure are open-ended terms that imply the possibility of including other embodiments, unless otherwise stated in a phrase or sentence including such expressions.

Expressions in a singular form described in the present disclosure may include plural meanings unless otherwise stated, and this applies equally to the expressions in the singular form set forth in the claims.

Expressions such as "first", "second", etc., used in the present disclosure are used to distinguish a plurality of components from one another, and do not limit the order or importance of the components.

In the present disclosure, when a component is referred to as being "connected" or "coupled" to another component, it should be understood that the component may be connected or coupled to the other component directly or via new another component.

A direction indicator of "upward" used in the present disclosure means a direction in which an upper end of a lifting/lowering rail is located, and a direction of "downward" means a direction in which a lower end of the lifting/lowering rail is located, and means the opposite direction to the upward direction.

Hereinafter, embodiments will be described with reference to the accompanying drawings. In the accompanying drawings, identical or corresponding components are given the same reference numerals. In addition, in the description of the following embodiments, redundant descriptions of the same or corresponding components may be omitted. However, omission of a description of a component does not intend that such a component is not included in an embodiment.

Embodiments described below and examples shown in the accompanying drawings relate to a wire installed inside a door of a vehicle to supply power to a window and a slider allowing the wire to maintain a tight state to have a constant tension at all times, thus preventing the wire from being stretched in an ascending/descending process of the window.

A power supply device for a window according to an embodiment is shown as being installed on a guide rail extending in a vertical direction and provided separately from a panel of a door, but the present disclosure is not limited thereto and thus the power supply device may also be applied to a case where a rail is installed on a modular panel including various components. In the present disclosure, the guide rail may be separately attached to a door panel or may be applied to a modular panel integrated with various components, but a power supply device installed on the modular panel may also belong to the scope of rights of the present disclosure.

A detailed description of the power supply device for the vehicle window according to an embodiment of the present disclosure is as provided below.

A power supply device 100 for a vehicle window may supply power to a window ascending and descending along a guide rail 140 provided inside a vehicle door.

More specifically, the power supply device 100 may include the guide rail 140 applied to a regulator lifting and lowering the window and provided inside a door of the vehicle, a pair of pulleys 150 respectively installed on an upper end and a lower end of the guide rail 140, a wire 160 that is wound around the pulleys 150 and performs circular trajectory movement along the guide rail 140, and a driving means 170 that drives the wire 160.

The guide rail 140 installed in the door may have a rectangular plate shape extending in a direction and include, at a side thereof, a bent portion bent perpendicularly and extending in a longitudinal direction of the guide rail 140 to guide a carrier plate 110 coupled to a bent portion of the lifting/lowering rail to slidably move.

Such a power supply device 100 for the vehicle window may include the carrier plate 110, a bracket 120, and a flexible connection means 130.

The carrier plate 110 may be formed in a rectangular plate shape as a whole, and include, at opposite sides thereof, a support 111 for supporting the window (not shown) and, in a center thereof, a stopping portion 112 slidably connected to the guide rail 140.

A wire coupling portion 113 to which a wire 160 for lifting or lowering the carrier plate 110 may be formed near the stopping portion 112, and an end of the wire 160 may be inserted into the wire coupling portion 113.

The window may be supported by a clamp (not shown) fixedly installed on a support body of the carrier plate 110 to ascend or descend together with the carrier plate 110.

A first electrical connection portion 114 may be provided on a back surface of the carrier plate 110.

The first electrical connection portion 114 may transfer an electrical signal supplied by a power source 141 to the window and may be installed such that the carrier plate 110 is removable.

More specifically, the first electrical connection portion 114 may include a first connector 1141 into which a line 123 is removably inserted for electrical connection to the window, a first cylindrical portion 1142 connected to the first connector 1141 and having a cylindrical shape, and a body plate 1143 to insertedly couple the first cylindrical portion 1142 to the carrier plate 110.

The first connector 1141 may extend from a side surface of the first cylindrical portion 1142 in a horizontal direction and may be opened, and in the first connector 1141, the line 123 may be installed in the horizontal direction. A side of the line 123 may be inserted into the first connector 1141, and the other side may be connected to the window, such that the window and the first electrical connection portion 114 may be electrically connected to each other.

The first cylindrical portion 1142 may be installed erected on the back surface of the carrier plate 110 and may have a cylindrical shape as a whole. The flexible connection means 130 may be connected to the first cylindrical portion 1142 in such a way to pivot, in which a first central shaft 1142*b* may protrude to pivotally support the flexible connection means 130 in a center of a cylindrical body 1142*a*.

An electric wire 134 extending from the flexible connection means 130 may be inserted between the cylindrical body 1142*a* and the first central shaft 1142*b* for electrical connection to the first connector 1141.

The body plate 1143 for supporting the first cylindrical portion 1142 may be inserted into and coupled to the carrier plate 110. The body plate 1143 may have a rectangular plate shape and may be stopped by a stopping protrusion of the carrier plate 110.

The bracket 120 may be fixed to the guide rail 140 between the upper end and the lower end of the guide rail 140. The bracket 120 may be installed in the center of the guide rail 140 to minimize a length of the flexible connection means 130 even when the carrier plate 110 is located at the uppermost end and the lowermost end.

The bracket 120 may include a support plate 121 and a cylindrical second electrical connection portion 122 erected on the support plate 121.

The support plate 121 may be fixedly installed in the center of the guide rail 140 and may be installed removably. To this end, a hook to be hooked to the guide rail 140 made of a metal material may be provided on the support plate 121.

The second electrical connection portion 122 may be installed erected in a cylindrical shape, with a side thereof to which the line 123 connected to the power source 141 may be connected and a center thereof to which the flexible connection means 130 may be pivotally connected. In the second electrical connection portion 122, the electric wire 134 connected with the power source 141 may continue from the flexible connection means 130.

The flexible connection means 130 may include a side electrically connected to the first electrical connection portion 114 of the carrier plate 110 and the other side electrically connected to the second electrical connection portion 122 of the bracket 120, and may transmit an electrical signal provided from the power source 141 to the first electrical connection portion 114 through the second electrical connection portion 122.

The side of the flexible connection means 130 may be pivotally connected to the first electrical connection portion 114 and the other side thereof may be pivotally connected to the second electrical connection portion 122, and in a process of the carrier plate 110 being lifted or lowered, the flexible connection means 130 may transmit the electrical signal from the power source 141 to the carrier plate 110 by being spread or curved between the first electrical connection portion 114 and the second electrical connection portion 122.

The flexible connection means 130 may include a first connection member 131, a second connection portion 132, and a cable 133.

The first connection member 131 having a pillar shape may be rotatably connected to the first electrical connection portion 114. The first connection member 131 having a cylindrical shape may be insertedly coupled to the first cylindrical portion 1142 of the first electrical connection portion 114.

As the first connection member 131 is pivotally connected in a state of being inserted into the first cylindrical portion 1142, lifting or lowering of the carrier plate 110 may not be disturbed and twisting of the cable 133 may be prevented.

The electric wire 134 passing through the first connection member 131 may be electrically connected to the first connector 1141 through the first cylindrical portion 1142, thus enabling electrical connection.

The second connection member 132 having a pillar shape may be rotatably connected to the second electrical connection portion 122. The second connection member 132 having a cylindrical shape may be insertedly coupled to a cylindrical portion of the second electrical connection portion 122.

As the first connection member 131 is pivotally connected in a state of being inserted into the first cylindrical portion 1142, lifting or lowering of the carrier plate 110 may not be disturbed and twisting of the cable 133 may be prevented.

The electric wire 134 passing through the first connection member 131 may be electrically connected to the first connector 1141 through the first cylindrical portion 1142, thus enabling electrical connection.

The cable 133 may interconnect the first connection member 131 and the second connection member 132 and may have a rectangular bar shape extending long in a direction. The cable 133 may include a plurality of electric wires 134 passing therethrough and may be made of a synthetic resin material having stiffness providing flexibility without droop.

The cable 133 may include a lateral surface 1331 extending from a side surface of the first connection member 131 in the pillar shape and a thickness surface 1332 located perpendicularly to the lateral surface 1331 and having a length less than that of the lateral surface 1331. The lateral surface 1331 may be erected perpendicularly to the guide rail 140 and may be such that the cable 133 may be curved in a direction perpendicular to the lateral surface 1331.

The lateral surface 1331 may not be bent in a direction perpendicular to the thickness surface 1332, thereby preventing the cable 133 from causing noise while colliding with surrounding fixtures inside the door.

Figure 1:
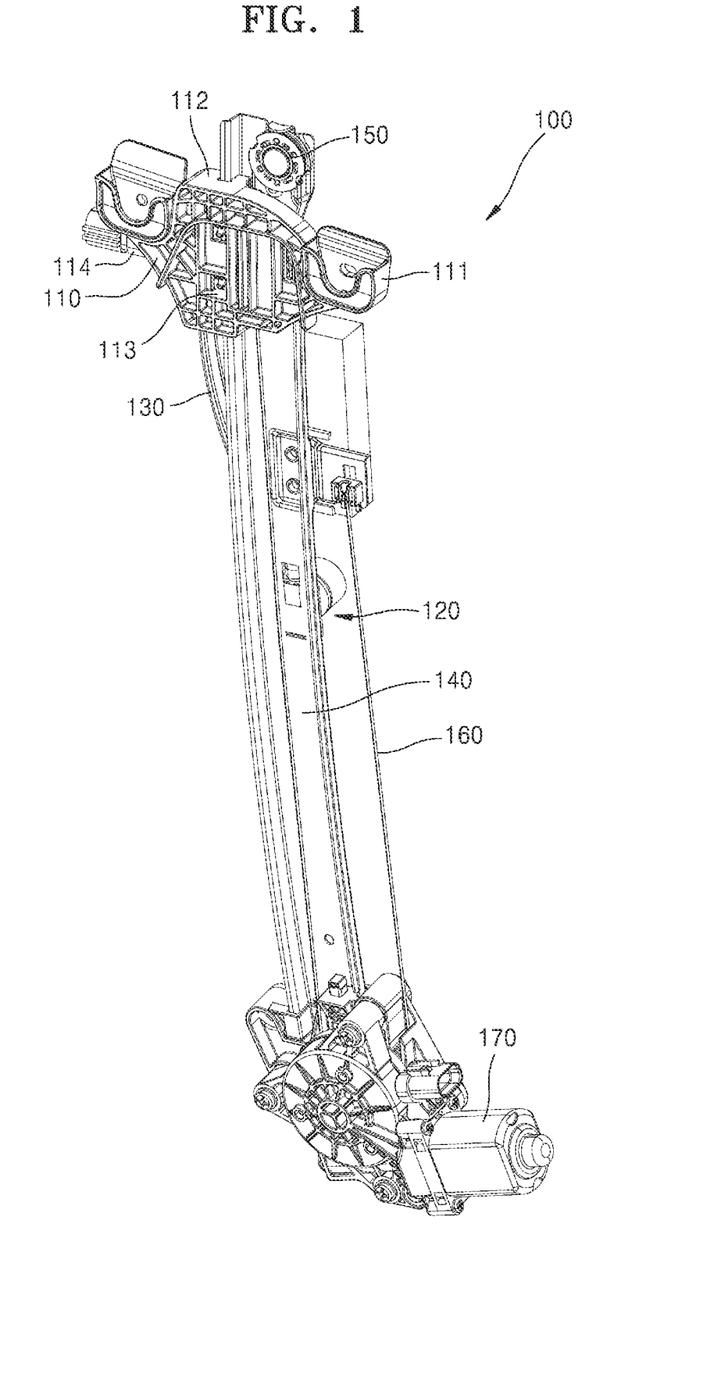
FIG. 1 is a front perspective view of a power supply device according to an embodiment of the present disclosure.
Figure 2:
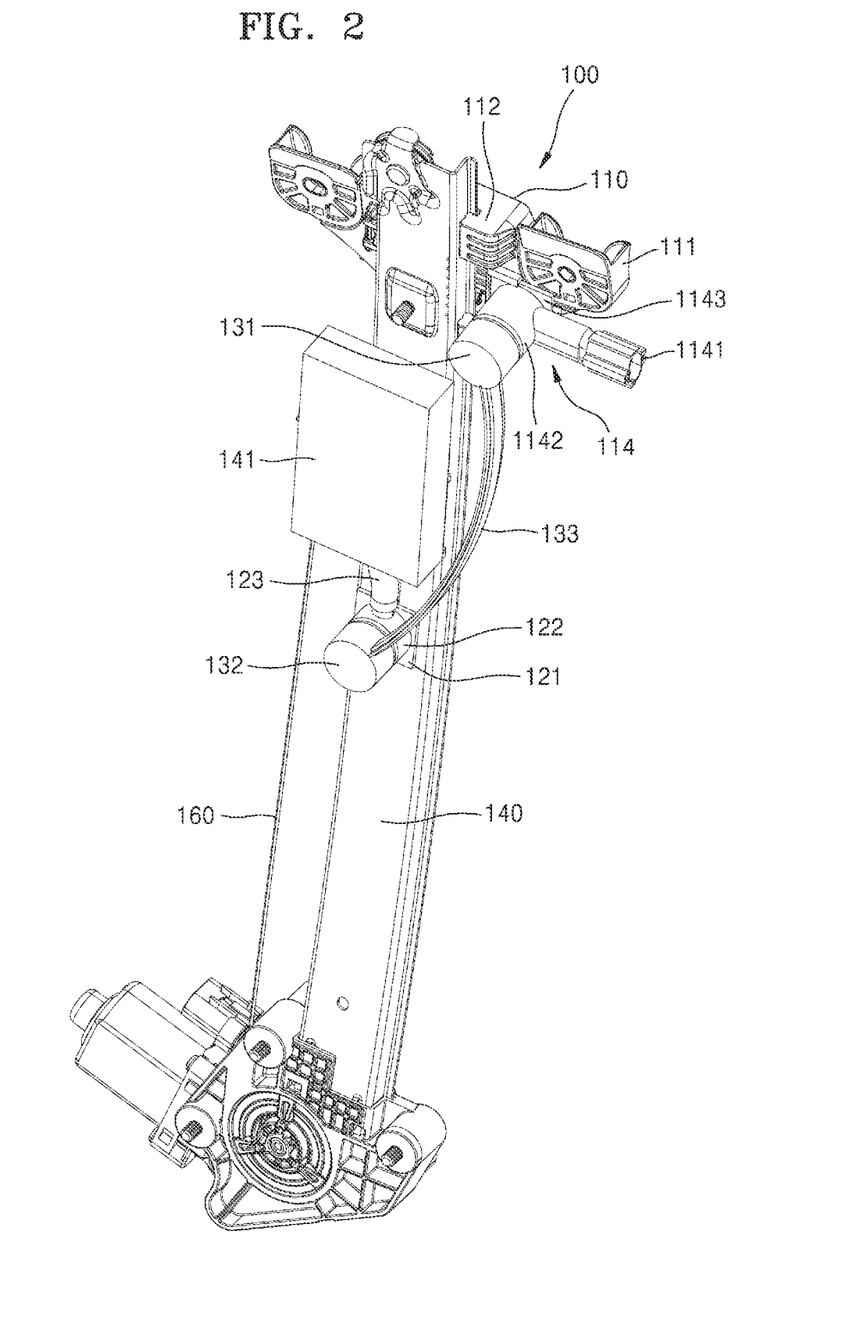
FIG. 2 is a rear perspective view of FIG. 1.
Figure 3:
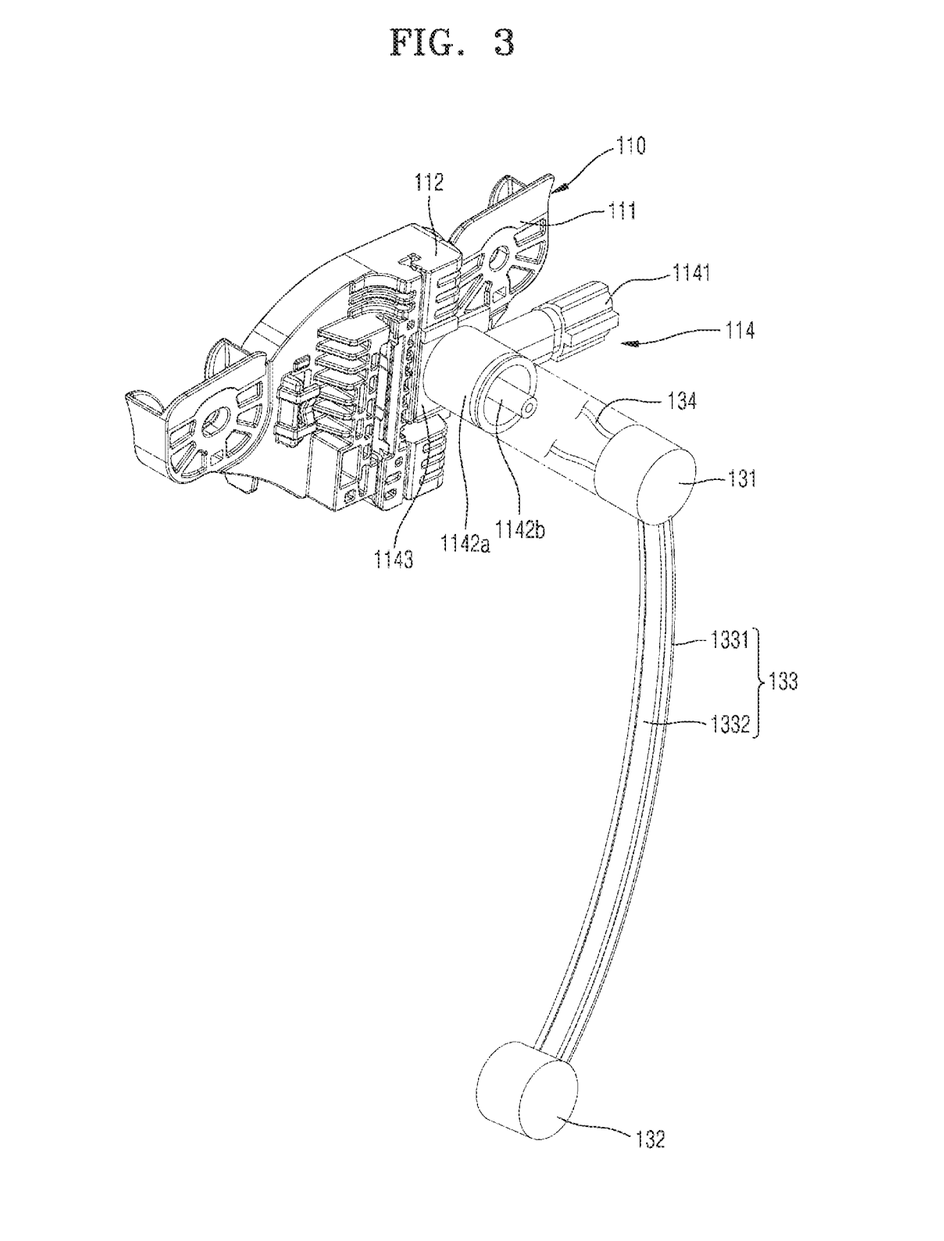
FIG. 3 is a detailed view of main components of the power supply device of FIG. 1.
Figure 4:
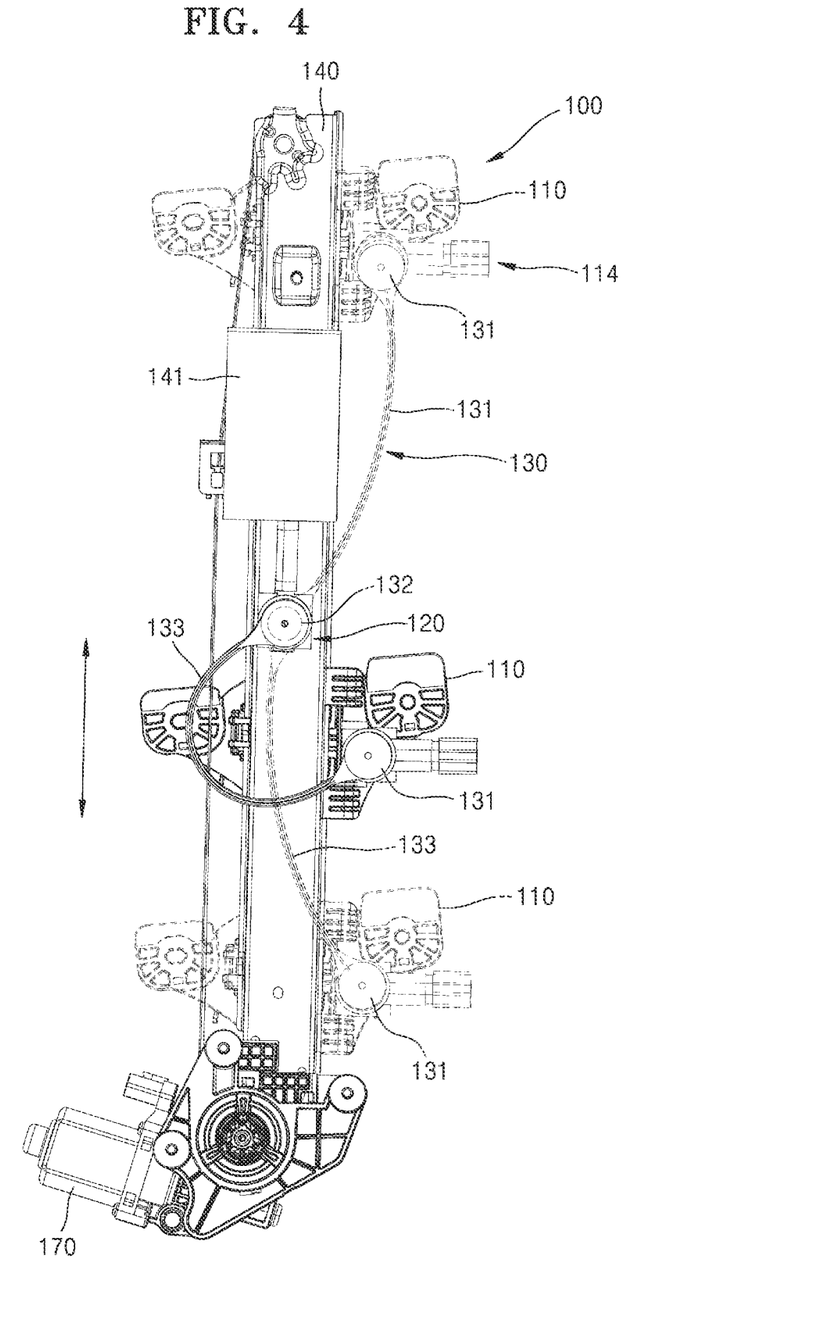
FIG. 4 is an operating view showing an operating state of the power supply device of FIG. 1.

The power supply device 100 for the vehicle window according to an embodiment of the present disclosure may operate as shown in FIG. 4.

First, when the carrier plate 110 is positioned in the middle of the guide rail 140, the cable 133 may be bent in the shape of "U" as indicated by a solid line of FIG. 4. Upon application of power, the electrical signal may travel to the second electrical connection portion 122 through the bracket 120 fixed on the guide rail 140, and then may be transmitted to the first electrical connection portion 114 of the carrier plate 110 via the cable 133 and the first electrical connection portion 114. Thereafter, the electrical signal traveling through the first electrical connection portion 114 may be transmitted to the window through the line 123, enabling a predetermined image to be displayed on the window.

In this state, when the carrier plate 110 is lifted and thus the window ascends, the first connection member 131 may rotate in a counterclockwise direction and the second connection member 132 may rotate in a clockwise direction. After the carrier plate 110 is lifted to the uppermost end, the bent cable 133 may be almost spread. The electrical signal applied from the power may travel to the second electrical connection portion 122 through the bracket 120 fixed on the guide rail 140, and then to the first electrical connection portion 114 of the carrier plate 110 via the cable 133 and the first electrical connection portion 114, after which the electrical signal traveling through the first electrical connection portion 114 may be transmitted to the window through the line 123, allowing a predetermined image to be displayed on the window.

In this state, as the carrier plate 110 is lowered for descending of the window, the first connection member 131 may rotate in the clockwise direction and the second connection member 132 may rotate in the counterclockwise direction. The cable 133 may be bent like a bow when the carrier plate 110 passes through the center of the guide rail 140, and the cable 133 may be slowly spread after the carrier plate 110 passes through the center, and the cable 133 may be completely spread when the carrier plate 110 is located at the lowermost end.

The power supply device 100 for the vehicle window according to the present disclosure may apply an electrical signal to the window in a state where the flexible connection means 130 is pivotally connected to the carrier plate 110 and the bracket 120, thereby enabling a correct operation while having a simple structure.

In this case, the flexible connection means 130 may be flexibly bent in a direction that is horizontal to a surface direction of the guide rail 140, but may not be bent in a direction that is perpendicular to the surface direction of the guide rail 140, thereby preventing the cable 133 from causing noise in contact with surrounding fixtures by being unnecessarily moved in an operating process.

The power supply device 100 for the vehicle window according to the present disclosure may adopt the cable 133 of 4 pins or more, thus being excellent in terms of function expandability of the window.

The power supply device 100 for the vehicle window according to the present disclosure is not limited thereto and may be modified as described below.

Figure 5:
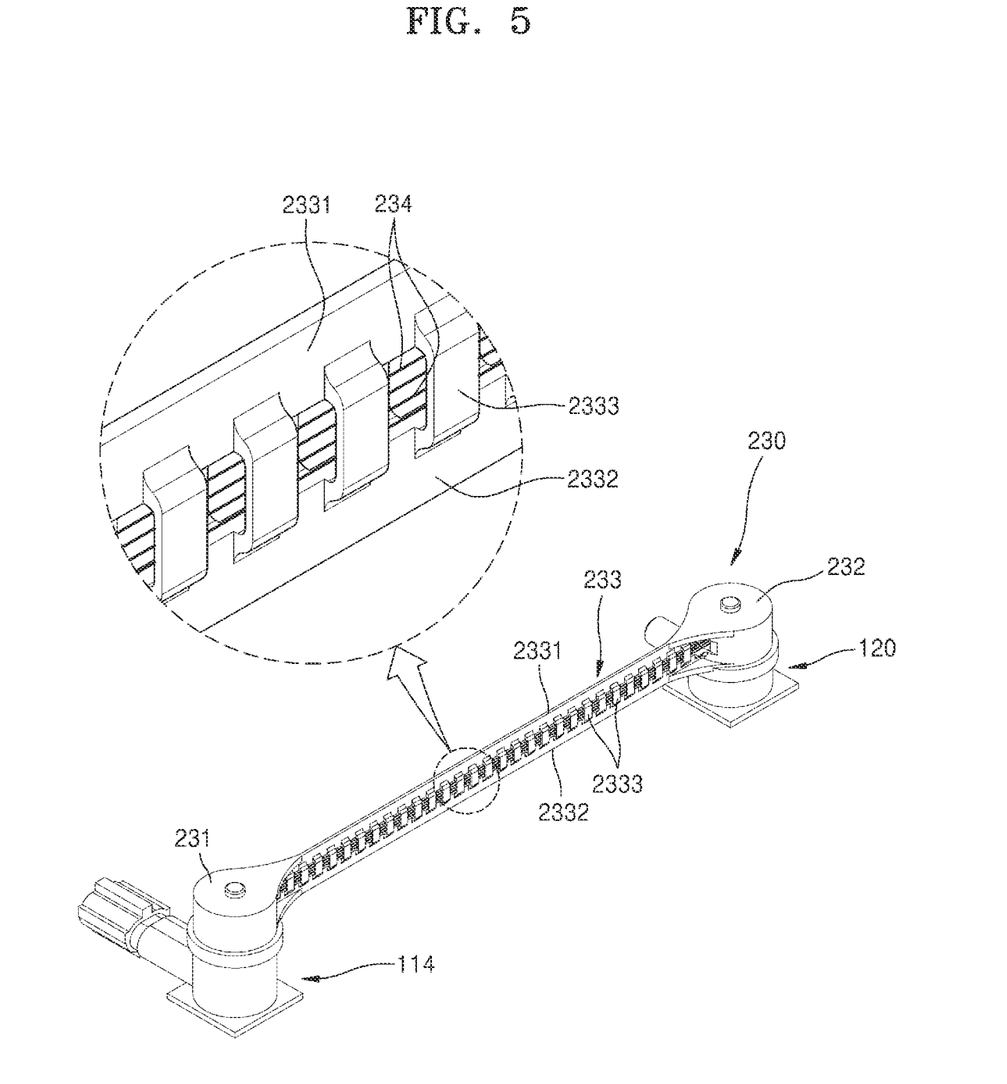
FIG. 5 is a perspective view of a power supply device according to another embodiment of the present disclosure.
Figure 6:
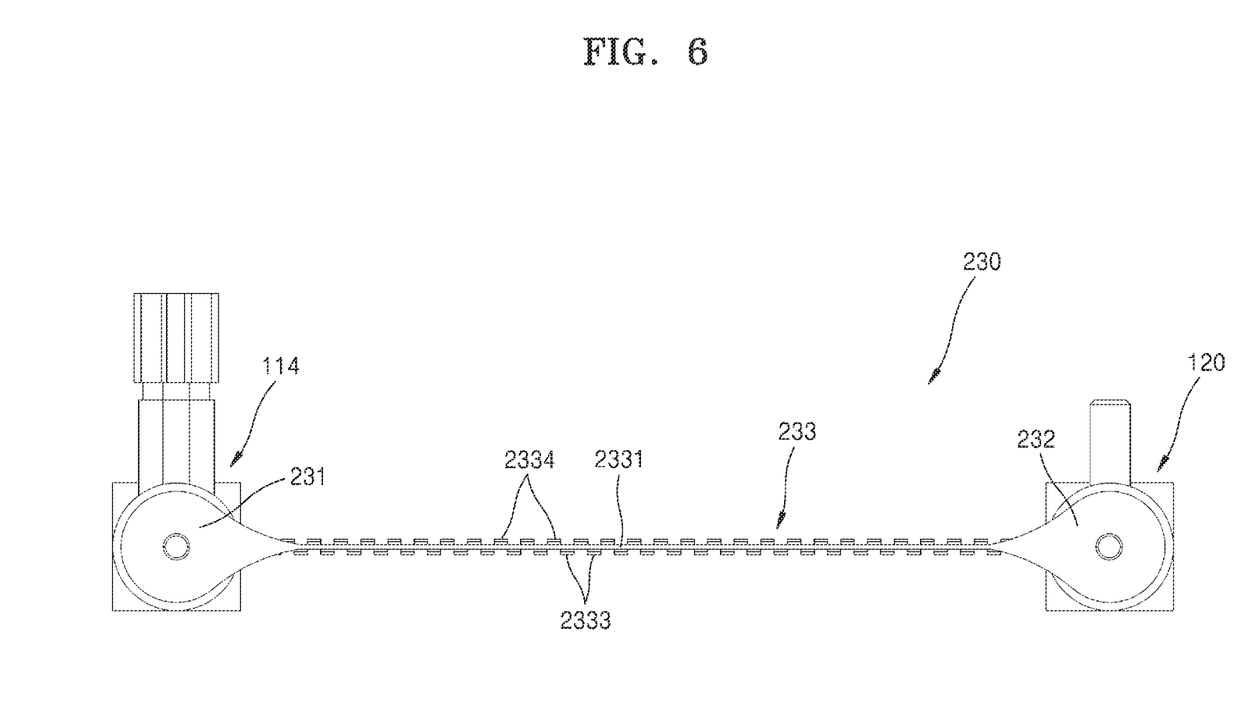
FIG. 6 is a plane view of the power supply device of FIG. 5.

FIGS. 5 and 6 show a power supply device for a vehicle window according to another embodiment. The carrier plate is the same as the power supply device for a vehicle window shown in FIGS. 1 to 4 and thus will not be described in detail.

In this case, the flexible connection means 230 may include a first connection member 231 having a pillar shape and rotatably connected to a first electrical connection portion 214, the second connection member 132 having a pillar shape and rotatably connected to a second electrical connection portion 222, and the cable 133 interconnecting the first connection member 131 and the second connection member 132.

The cable 133 may include a first connection bar 2331 and a second connection bar 2332 extending long in a direction and positioned in parallel to each other, first connection members 2333 interconnecting a surface of the first connection bar 2331 to a surface of the second connection bar 2332 and separated from each other in the longitudinal direction, and second connection members 2334 interconnecting the other surface of the first connection bar 2331 and the other surface of the second connection bar 2332 and arranged alternately with the first connection members 2333.

The electric wire 234 for transmitting the electrical signal may interconnect the first connection members 2333 and the second connection members 2334 while passing through the first connection members 2333 and the second connection members 2334.

As the first connection members 2333 and the second connection members 2334 are arranged alternately, the electric wire 234 may be easily bent on the surface horizontal to the surface direction of the guide rail 140 while being prevented from being bent in the direction perpendicular to the surface direction of the guide rail 140.

Figure 7:
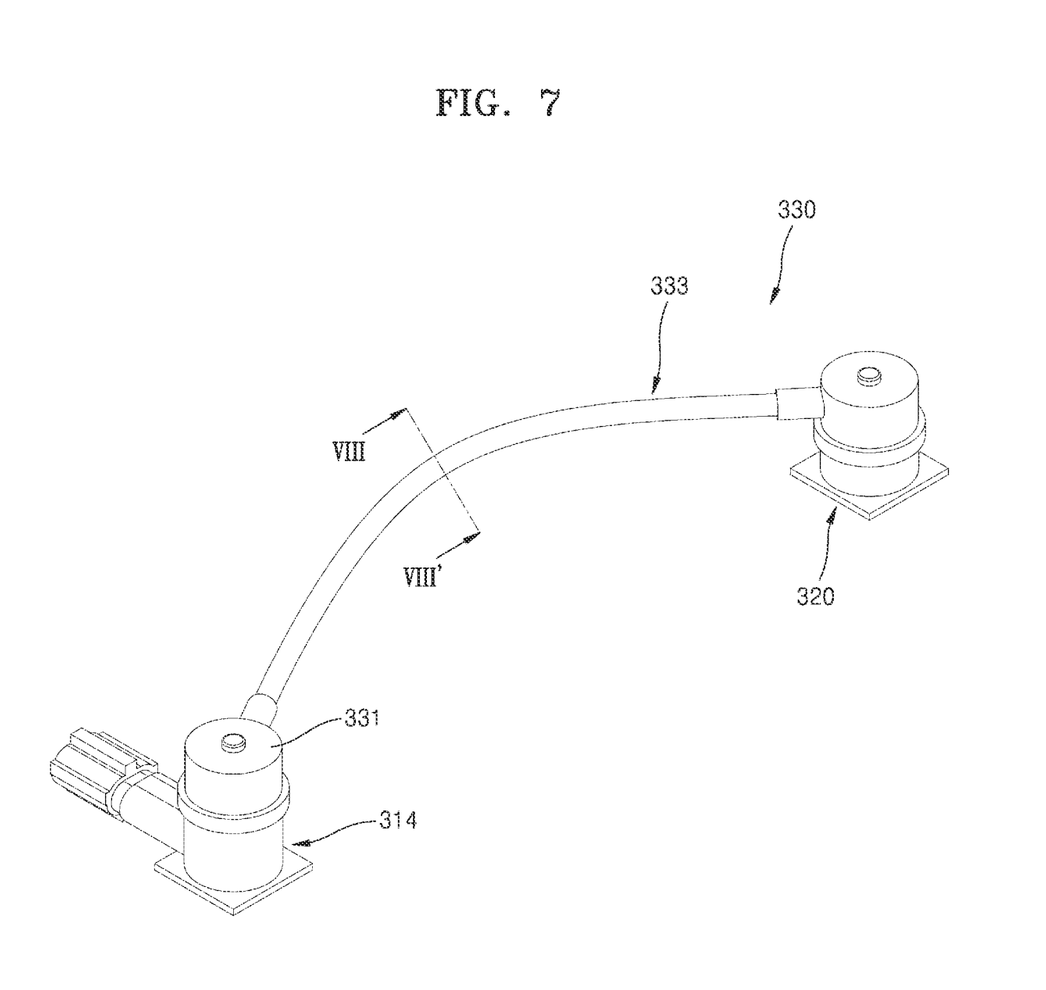
FIG. 7 is a perspective view of a power supply device according to another embodiment of the present disclosure.
Figure 8:
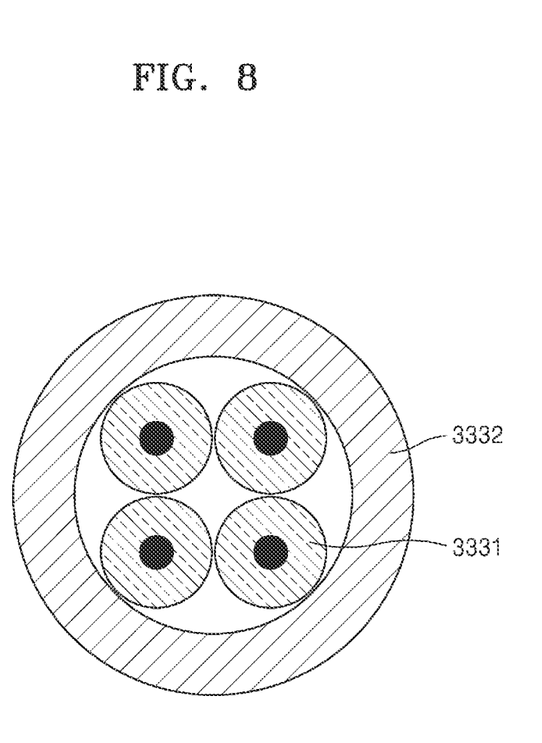
FIG. 8 is a cross-sectional view taken along line VIII-VIII of FIG. 7.

FIGS. 7 and 8 show a power supply device for a vehicle window according to another embodiment.

The carrier plate 110 is the same as the power supply device for a vehicle window shown in FIGS. 1 to 4 and thus will not be described in detail.

A flexible connection means 330 shown in FIGS. 7 and 8 may include a first connection member 331 having a pillar shape and rotatably connected to a first electrical connection portion 314, the second connection member 132 having a pillar shape and rotatably connected to a second electrical connection portion 322, and the cable 133 interconnecting the first connection member 331 and the second connection member 132.

The cable 133 may extend long while having a circular cross-section. More specifically, the cable 133 may include a plurality of electric wires 134 and a covering that covers the plurality of electric wires 134. As such, the cable 133 has a circular structure, thus being easily bent.

Figure 9:
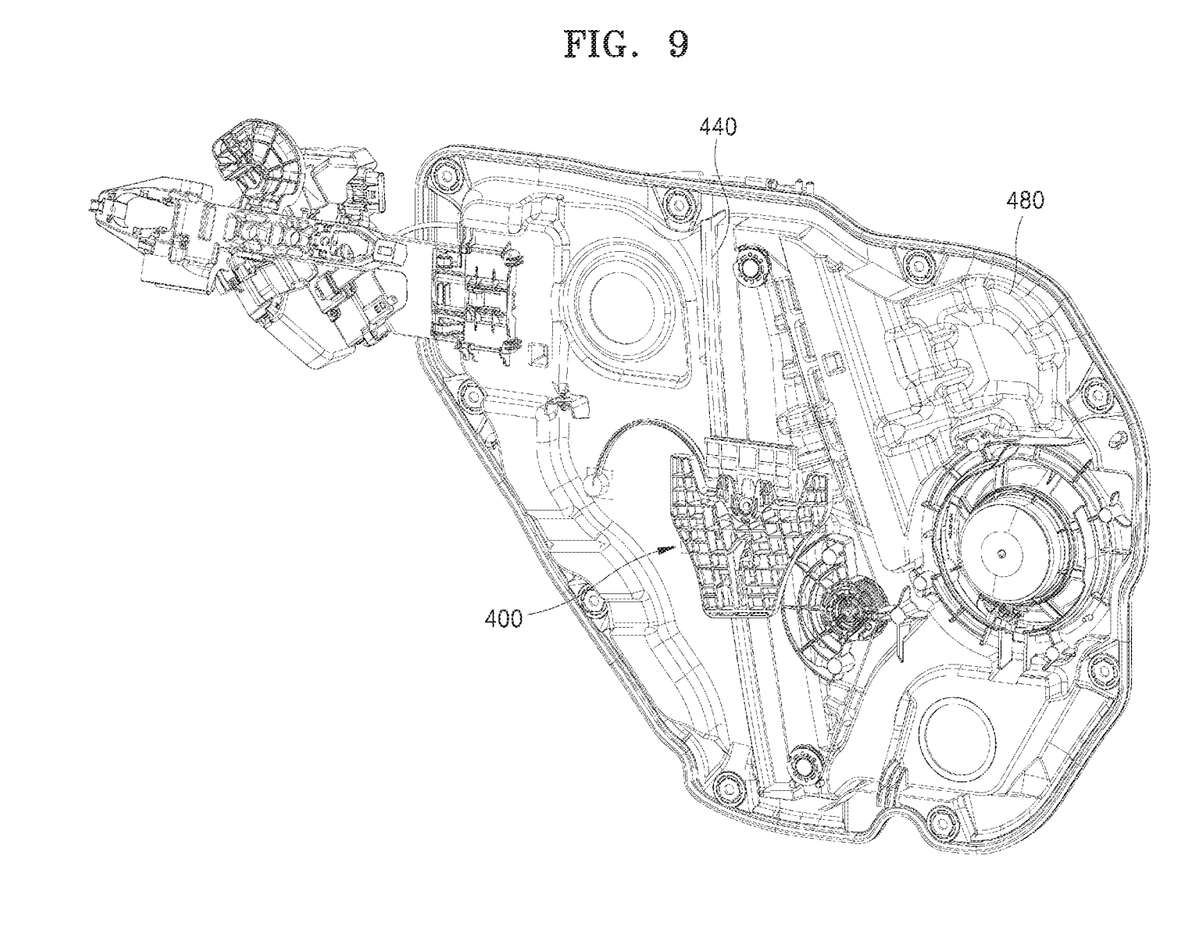
FIG. 9 is a view showing a state of the power supply device of FIG. 1 being installed on a modular panel.

In FIG. 9, a power supply device 400 for a vehicle window is installed on a modular panel 480. In FIGS. 1 to 4, the power supply device 100 for the vehicle window is installed in the guide rail 140 attached separately inside the door, but, without being limited thereto, the power supply device 100 may also be applied to a modular structure where a guide rail 440 is integrated into the modular panel 480 as shown in FIG. 9.

In this case, the bracket 120 may also be installed integrally with a door module.

While the power supply device for the vehicle window according to the present disclosure has been described with various embodiments, it is not limited thereto, and any matter that may be reasonably interpreted from the scope of the present disclosure is naturally within the scope of the present disclosure.

The invention claimed is:

1. A power supply device for a vehicle window to supply power to the vehicle window, the power supply device comprising:
   a carrier plate configured to be lifted or lowered along a guide rail and to be lifted or lowered inside a door together with a window fixedly coupled to the carrier plate, the carrier plate comprising a first electrical connection portion to transmit power to the window;
   a bracket fixedly disposed on the guide rail or a periphery portion of the guide rail between an upper end and a lower end of the guide rail, the bracket comprising a second electrical connection portion to which a power source is connected; and
   a flexible connector comprising a side electrically connected to the first electrical connection portion of the carrier plate and another side electrically connected to the second electrical connection portion of the bracket, the flexible connector being configured to transmit an electrical signal supplied from the power source to the first electrical connection portion through the second electrical connection portion,
   wherein the side of the flexible connector is pivotally connected to the first electrical connection portion and the another side of the flexible connector is pivotally connected to the second electrical connection portion,
   wherein, when the carrier plate is lifted or lowered, the flexible connector is configured to be spread or bent between the first electrical connection portion and the second electrical connection portion to transmit the electrical signal of the power source to the carrier plate,
   wherein the flexible connector comprises:
   a first connection member having a pillar shape and rotatably connected to the first electrical connection portion;
   a second connection member having a pillar shape and rotatably connected to the second electrical connection portion; and
   a cable interconnecting the first connection member and the second connection member.

2. The power supply device of claim 1,
   wherein the cable has a bar shape having a rectangular cross-section,
   wherein the cable comprises a lateral surface extending from a side surface of the first connection member and a thickness surface positioned perpendicularly to the lateral surface, the thickness surface having a length less than a length of the lateral surface, and
   wherein the cable is configured to be bent in a direction perpendicular to the side surface, the cable being configured to be prevented from being bent in a direction perpendicular to the thickness surface.

3. The power supply device of claim 2,
   wherein a plurality of electric wires extend in a longitudinal direction of the cable inside the cable, the plurality of electric wires being connected to the first electrical connection portion through the first connection member.

4. The power supply device of claim 1,
   wherein the cable comprises:
   a first connection bar and a second connection bar that extend in a direction and are arranged in parallel to each other;
   first connection members interconnecting a surface of the first connection bar and a surface of the second connection bar, the first connection members being disposed apart from each other in a longitudinal direction;
   second connection members interconnecting another surface of the first connection bar and another surface of the second connection bar, the second connection members being arranged alternately with the first connection members; and
   a plurality of electric wires passing through the first connection members and the second connection members.

5. The power supply device of claim 1,
   wherein the cable comprises a plurality of electric wires and a covering having a circular cross-section to cover the plurality of electric wires.

* * * * *